UNITED STATES PATENT OFFICE.

JOSEPH W. BLACK, OF PHILADELPHIA, PENNSYLVANIA.

IMPROVEMENT IN PROCESSES FOR CANNING HAMS.

Specification forming part of Letters Patent No. 223,106, dated December 30, 1879; application filed August 20, 1879.

*To all whom it may concern:*

Be it known that I, JOSEPH W. BLACK, of the city of Philadelphia, in the State of Pennsylvania, have invented a new and useful Process of Boiling and Packing Hams in Hermetically-Sealed Cans, which process is fully set forth in the following specification.

This invention relates to that class of processes employed in the preparation of cooked meats and packing the same in cans ready to be eaten; and it consists in first subjecting the whole ham to immersion in a running stream of boiling water until it is partially cooked, then taking it out of said water and removing the skin and bone, then packing it into a specially-constructed can and sealing it up hermetically therein by soldering the said can up tightly, after which it is "processed" for the space of from three to five hours, according to size of the ham.

In carrying out my invention I have a boiler or trough so constructed that boiling water may be kept continually running through the same, and into this boiling-water I immerse the ham, so that it shall all be subjected to the constantly-changing stream. This freshens the ham and nearly cooks it, and the process continuing from two to four hours, according to the size of the ham, is so gradual that the ham preserves its original shape and retains all its fiber and juices, which are subject to destruction under the other processes now in vogue. After the ham has been nearly cooked in this way it is withdrawn from the boiling water, and I skillfully remove the skin and bone, taking care not to remove or hack the fiber; then put it into a can of any convenient shape, the circular or cylindrical being preferred as best adapted for the purpose, and by soldering up the can hermetically seal the partially-cooked ham within the same. After the said ham has been so hermetically sealed up in the can, I then "process" it by submerging it in a chemical bath made by using chloride of calcium in the boiling water; or in lieu of that, when undesirable, I use dry steam under pressure, for the purpose of raising the temperature up to 260° for the first hour. I then gradually reduce the temperature to 230° for two hours, and further reduce the same to 212°, giving a total of about four hours to processing as aforesaid, which process keeps the ham much fresher and more palatable than the process of cooking hams in sealed-up cans or packages, either whole, boned, or cut up into small pieces, as is the case in the several methods of preparing cooked ham hitherto and now in vogue, all of which processes I disclaim.

I am aware that the boning of hams for curing and cooking is not new, but that the same is set forth in Patent No. 97,268, containing a process for boning and curing hams, in which it is specified that the first step in said process is the extraction of the bone; and, furthermore, that Patent No. 175,757 sets forth, as preliminary to placing the ham in a tin can and cooking the same, that in preparing the ham the bone is first skillfully cut around by means of a long knife and then withdrawn.

I do not claim either the boning of hams or the methods, or either of them, above alluded to, as my process differs essentially from them and others in first subjecting the whole ham for several hours to immersion in a running stream of boiling water, and then removing the skin and bone.

I am also aware that it is not new to preserve meats by grinding or cutting up the same and cooking them after being sealed; but this process is so obviously different from mine that it cannot be held to subserve the same purpose, and I therefore disclaim it, as also the covering of cured (not cooked) hams in metallic coverings corresponding to the shape of the ham as a substitute for the ordinary bagging in common use, as claimed in Patent No. 112,467.

I claim as my invention—

The process of boiling and canning hams by first immersing the same in continually-changing boiling water made to pass on and off of said hams until the same are nearly cooked, then withdrawing, skinning, boning, and trimming the hams, and, after hermetically sealing the same up in tin cans, processing the same by immersion in a chemical bath at a temperature of from 260° graduated down to 212° for from three to five hours, all substantially as described.

JOSEPH WALTER BLACK.

Witnesses:
GEO. C. BONBRIGHT,
GEO. F. BLACK.